US009930009B2

(12) United States Patent
Adrangi et al.

(10) Patent No.: US 9,930,009 B2
(45) Date of Patent: Mar. 27, 2018

(54) SYSTEMS AND METHODS TO ENABLE NETWORK COORDINATED MAC RANDOMIZATION FOR WI-FI PRIVACY

(71) Applicant: Intel IP Corporation, Santa Clara, CA (US)

(72) Inventors: Farid Adrangi, Lake Oswego, OR (US); David Johnston, Beaverton, OR (US)

(73) Assignee: Intel IP Corporation, Santa Clara, CA (US)

( * ) Notice: Subject to any disclaimer, the term of this patent is extended or adjusted under 35 U.S.C. 154(b) by 70 days.

(21) Appl. No.: 14/859,023

(22) Filed: Sep. 18, 2015

(65) Prior Publication Data
US 2016/0269359 A1    Sep. 15, 2016

Related U.S. Application Data

(60) Provisional application No. 62/132,887, filed on Mar. 13, 2015.

(51) Int. Cl.
*H04L 29/12* (2006.01)
*H04L 12/741* (2013.01)
*H04L 29/06* (2006.01)
*H04W 12/02* (2009.01)
*H04W 12/06* (2009.01)
(Continued)

(52) U.S. Cl.
CPC ........ *H04L 61/6022* (2013.01); *H04L 45/745* (2013.01); *H04L 61/2038* (2013.01); *H04L 61/2596* (2013.01); *H04L 63/0414* (2013.01); *H04W 12/02* (2013.01);
(Continued)

(58) Field of Classification Search
CPC ........ H04L 49/351; H04L 69/16; H04L 12/46
See application file for complete search history.

(56) References Cited

U.S. PATENT DOCUMENTS 7,359,989 B2 *  4/2008  Orava ............... H04L 29/12254
                                                           370/392
7,822,033 B1   10/2010  Parker et al.
(Continued)

FOREIGN PATENT DOCUMENTS

WO     2007086705      8/2007

OTHER PUBLICATIONS

International Search Report and Written Opinion from PCT Application No. PCT/US2016/021558 dated Jul. 8, 2016. (12 pgs.).

*Primary Examiner* — Charles C Jiang
*Assistant Examiner* — Rose Clark
(74) *Attorney, Agent, or Firm* — Eversheds Sutherland (US) LLP

(57) ABSTRACT

This disclosure describes systems, methods, and apparatus related to receiving, at an access point and from a wireless communication station, a media access control (MAC) address of the wireless communication station; assigning, at the access point, a prefix to the MAC address of the wireless communication station; receiving, at the access point and from the wireless communication station, a frame comprising the prefix and a random MAC address; replacing, at the access point and using the prefix, the random MAC address in the frame with the MAC address of the wireless communication station, thereby resulting in a processed frame; and transmitting, at the access point and to a destination device, the processed frame.

14 Claims, 8 Drawing Sheets

(51) Int. Cl.
  *H04L 9/08* (2006.01)
  *H04W 84/12* (2009.01)
(52) U.S. Cl.
  CPC ........... *H04L 9/0844* (2013.01); *H04W 12/06* (2013.01); *H04W 84/12* (2013.01)

(56) References Cited

U.S. PATENT DOCUMENTS

| | | |
|---|---|---|
| 7,961,724 B2 | 6/2011 | Dyck et al. |
| 2008/0195867 A1* | 8/2008 | Asokan ............... H04L 63/0861 713/176 |
| 2008/0205425 A1 | 8/2008 | Vuppula et al. |
| 2013/0308641 A1* | 11/2013 | Ackley ............... H04L 45/7457 370/392 |
| 2014/0064196 A1* | 3/2014 | Abraham ............ H04W 40/246 370/329 |

* cited by examiner

SYSTEMS AND METHODS TO ENABLE NETWORK COORDINATED MAC RANDOMIZATION FOR WI-FI PRIVACY

CROSS REFERENCE TO RELATED APPLICATIONS

This United States Non-Provisional patent application claims priority to U.S. Provisional Patent Application No. 62/132,887 filed on Mar. 13, 2015 and entitled "METHOD AND APPARATUS TO ENABLE NETWORK COORDINATED MAC RANDOMIZATION FOR WIFI PRIVACY," the entire contents of which are hereby incorporated by reference for all purposes.

TECHNICAL FIELD

This disclosure generally relates to systems and methods for wireless communications and, more particularly, to utilizing Media Access Control (MAC) randomization in wireless communications technologies.

BACKGROUND

In a wireless communication system, a MAC address may be associated with a user device to enable identification of the user device and/or a user of the user device. However, an attacker may, during passive surveillance of wireless communications, observe the MAC address, which may enable the attacker to track a location of the user device and/or identify information associated with the user of the user device. As such, the privacy of the identity of the user may be at risk.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Example Embodiments described herein are directed to systems, methods, and apparatuses for enabling network coordinated Media Access Control (MAC) randomization for Wi-Fi privacy. More particularly, described herein are MAC randomization techniques that may be administered at an access point of a wireless communication system. Embodiments disclosed herein provide a privacy mechanism in 802.11 through an 802.11 access point administered MAC address randomization solution for three different Wi-Fi operation states, namely Connected & Authenticated, Connected & Open Authentication, and Not Connected modes. Further, MAC randomization techniques described herein may be administered at the access point in conjunction with MAC randomization techniques administered at the device.

By administering MAC randomization techniques at the access point as opposed to administering MAC randomization techniques locally (e.g., at a user device of the wireless communication station), MAC address collisions (e.g., duplications of MAC addresses, collisions between adjacent MAC addresses, and/or the like) and/or wireless communication service breakdowns due to MAC address-dependent operations may be avoided. For example, some existing locally administered MAC address randomization solutions may randomize MAC addresses at a user device with no coordination with and/or communication between other devices (e.g., an access point and/or other user devices). As such, locally administered MAC address randomization faces limitations because it may not address MAC address collision of competing user devices. Additionally, a locally administered MAC address randomization solution may break communication and/or operation of a wireless communication network where network switches and/or bridges implement state-full firewall MAC address filtering. Furthermore, wireless communication services relying upon a randomized MAC address of a user device may also fail due to inconsistencies of random MAC address assignment to the same user device. For example, each transmission of a user device may utilize a unique random MAC address, and therefore various components in a wireless communication system may not recognize subsequent transmissions as being associated with the same user device.

Figure 1:
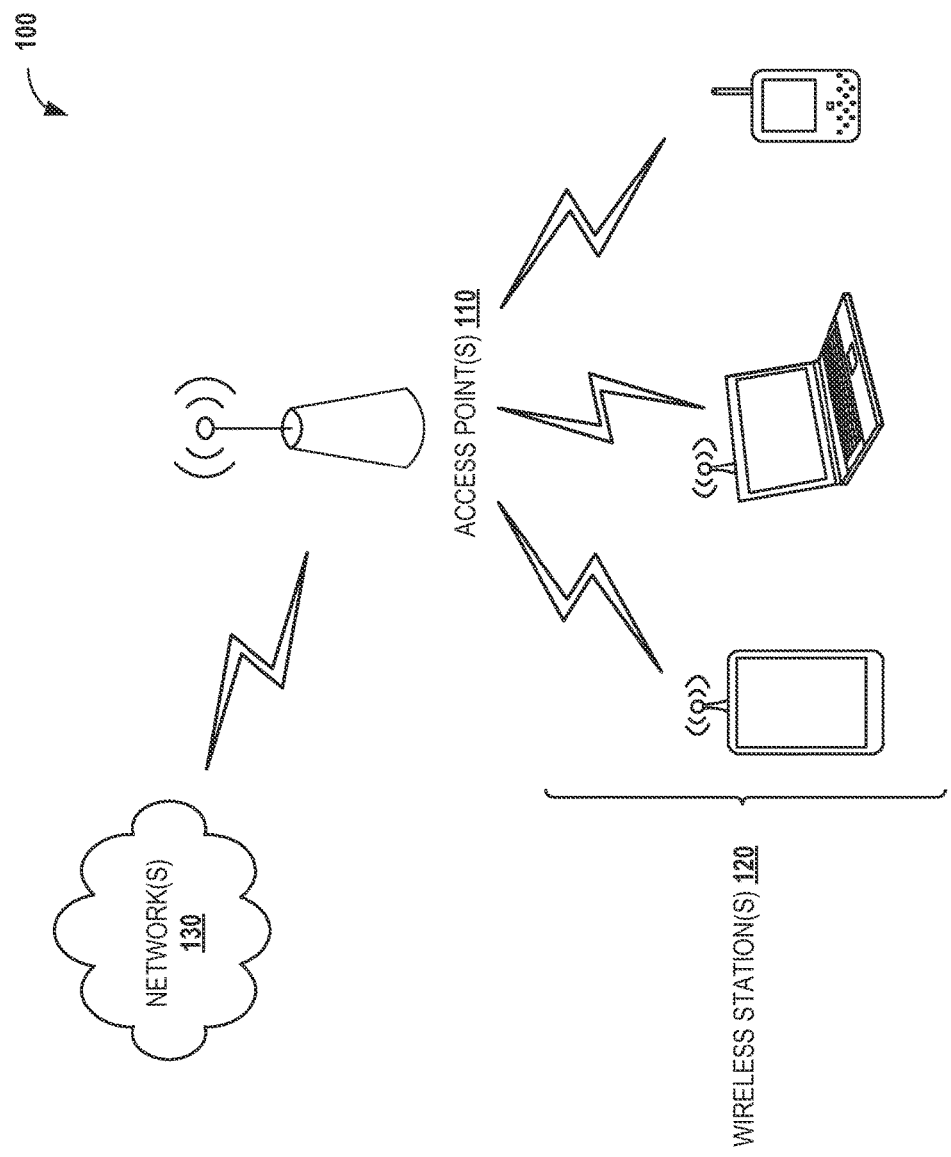
FIG. 1 depicts a network diagram illustrating an example network environment of an illustrative wireless communication system, according to one or more example embodiments of the disclosure.

Referring now to FIG. 1, illustrated is a network diagram of an example network environment 100, according to some example embodiments of the present disclosure for implementing network coordinated (e.g., access point-administered) MAC randomization for Wi-Fi privacy according to the disclosure herein. Network environment 100 may include one or more access points 110 (APs 110) and/or one or more wireless stations 120 (STAs 120), which may communicate in accordance with IEEE 802.11 communication standards, including IEEE 802.11 ax amendment. In some embodiments, the one or more APs 110 and/or the one or more STAs 120 can include one or more computer systems similar to that of the exemplary functional diagrams of FIGS. 4-7.

For example, the one or more APs 110 may be stationary and have fixed locations and/or non-stationary and may embody a router, a switch, a mobile hotspot, and/or the like. The one or more STAs 120 may be user devices, mobile devices, stations, and/or the like that are non-stationary and do not have fixed locations, and may include any suitable processor-driven user device including, but not limited to, a desktop computing device, a laptop computing device, a server, a router, a switch, a smartphone, a tablet, wearable wireless device (e.g., bracelet, watch, glasses, ring, etc.) and so forth. The one or more STAs 120 may be operable by one or more users.

Any of the one or more STAs 120 and/or the one or more APs 110 may be configured to communicate with each other in a wireless or wired mode. In some embodiments, an AP 110 may provide each STA 120 with access to one or more communication networks 130. Any of the communications networks 130 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof. The one or more APs 110 and/or the one or more STAs 120 may also communicate with one another using the one or more communication networks 130.

Any of the one or more APs 110 and/or the one or more STAs 120 may include one or more communications antennas. A communications antenna may be any suitable type of antenna corresponding to the communications protocols used by the one or more APs 110 and/or the one or more STAs 120. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as to enable transmission and/or receipt of communications signals between the one or more APs 110 and/or the one or more STAs 120.

Any of the one or more APs 110 and/or the one or more STAs 120 may include any suitable radio and/or transceiver for transmitting and/or receiving radio frequency (RF) signals in the bandwidth and/or channels corresponding to the communications protocols utilized by any of the one or more APs 110 and/or the one or more STAs 120 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. IEEE 802.11b, IEEE 802.11g, IEEE 802.11n), 5 GHz channels (e.g. IEEE 802.11n, IEEE 802.11ac), or 60 GHZ channels (e.g. IEEE 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Figure 2A:
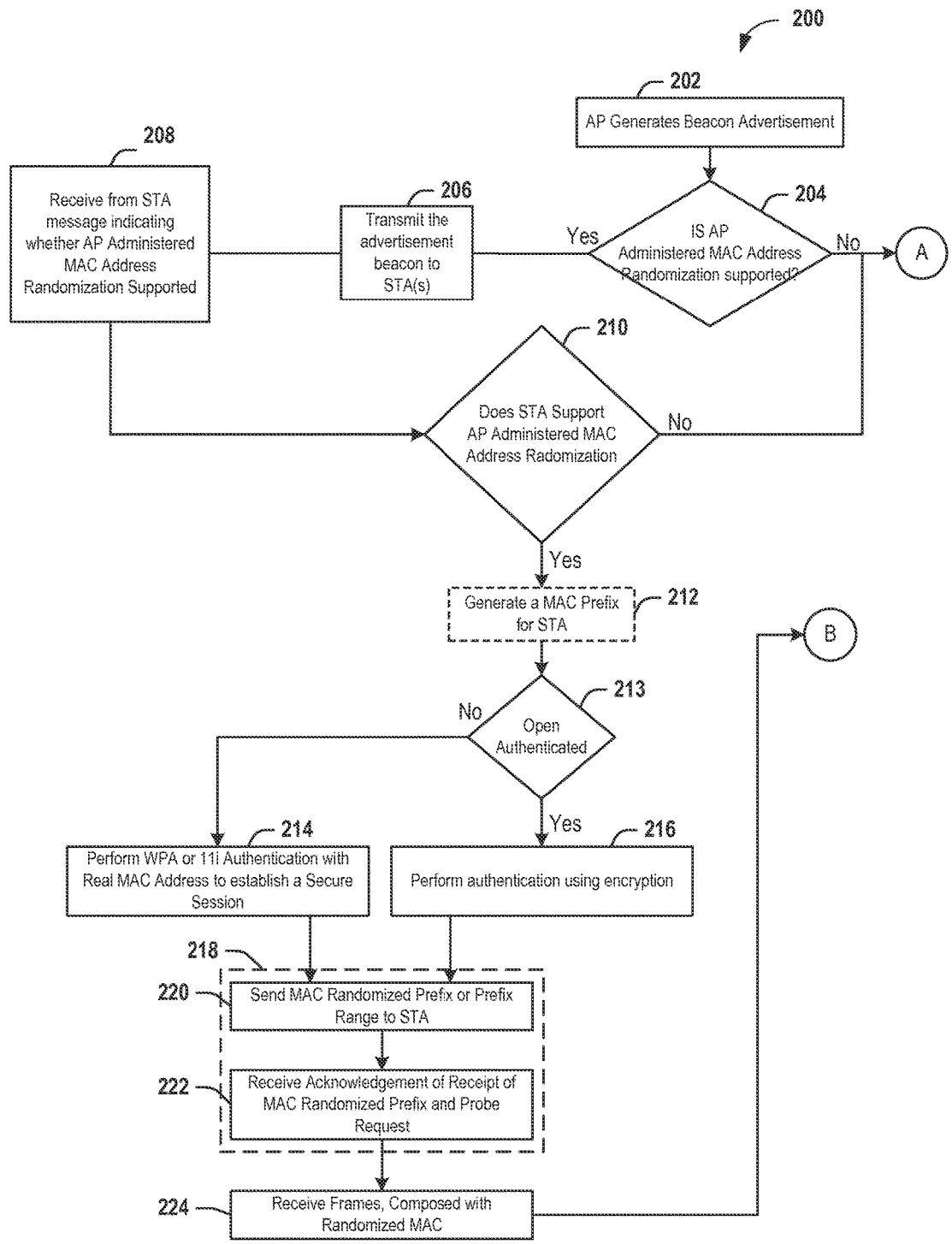
FIGS. 2A and 2B depict an example process flow for a hybrid MAC randomization solution model, according to one or more example embodiments of the disclosure.
Figure 2B:
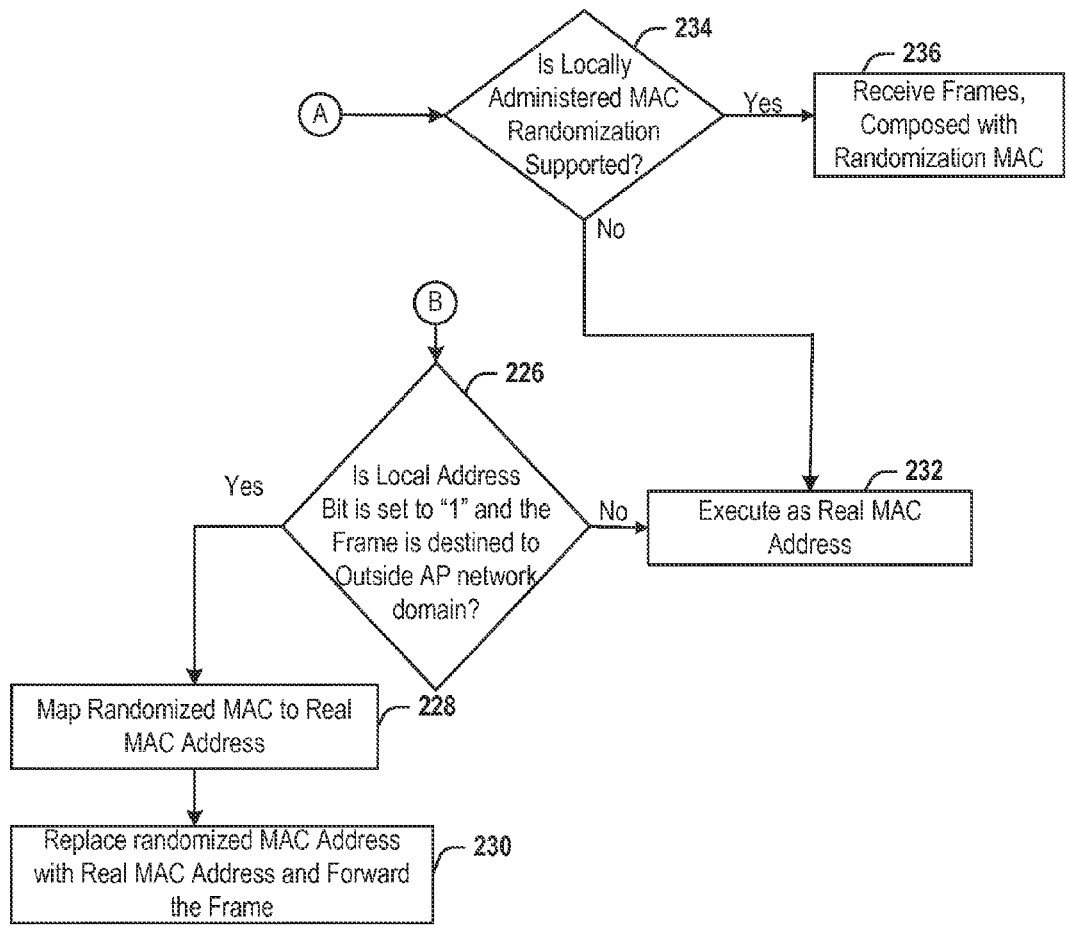

Referring now to FIGS. 2A and 2B, illustrated is an exemplary process flow 200 for a hybrid MAC randomization solution model. In this manner, the process flow 200 illustrates exemplary embodiments that enable random MAC address administration at both an AP 110 and an STA 120 of FIG. 1 for three different operation modes, namely Connected & Authenticated, Connected & Open Authentication, and Not Connected.

At block 202, the AP 110 may first generate an advertisement beacon. The advertisement beacon may embody a data packet, a trigger frame, a message, and/or the like and may include an indication that the AP 110 supports AP-administered MAC address randomization according to the present disclosure.

At block 204, the AP 110 may determine, based on one or more preferences, settings, user inputs, and/or the like, that it supports AP-administered MAC address randomization.

At block 206, the AP 110 may broadcast and/or transmit the advertisement beacon to the STA 120 (or one or more STAs 120, though for illustrative purposes a single STA 120 is described). Upon receipt of the advertisement beacon, the STA 120 may generate an identity response message at block 208 that is sent back to the AP 110. In some embodiments, the identity response message includes an identity of the STA 120 (e.g., the MAC address of the STA 120) and further indicates that the STA 120 supports AP-administered MAC address randomization. Additionally, if the STA 120 supports an Open Authentication mode as described below, the identity response message may include one or more Diffie-Hellman (DH) parameters.

At block 210, the AP 110 may determine that AP-administered MAC address randomization is supported by the STA 120 if the STA 120 transmitted to the AP 110 an identity response message to the AP 110 that indicates that the STA 120 indeed supports AP-administered MAC address randomization. Stated differently, the AP 110 may determine the STA 120 supports AP-administered MAC address randomization using the identity response message received from the STA 120.

At block 212, the AP 110 may determine the MAC address (e.g., the real MAC address) of the STA 120 using the identity response message and generate a prefix message using the MAC address in the identity response message. The prefix message may include and/or indicate a prefix that is to be included in each transmission frame (e.g., message, data, and/or the like) transmitted by the STA 120. For example, the prefix may be included in a prefix portion (e.g., a preamble) of a transmission frame transmitted by the STA 120.

The prefix may serve to identify and/or indicate the identity of the STA 120. For example, the prefix message may include an indication a user of the STA 120 and/or the STA 120, the real MAC address of the STA 120, and/or the like. In some embodiments, the prefix may include a number and/or sequence of bits that correspond to the MAC address of the STA 120. In some embodiments, the prefix may be generated based on a predetermined function and/or algorithm, a random number, and/or the like. In this manner, the AP 110 may determine, based on processing a received communication from STA 120 including the prefix, the real MAC address of the transmitting STA 120.

In some embodiments, the AP 110 may assign (e.g., map in a table in an associated database) the real MAC address of the STA 120 to one or more prefixes. For example, one prefix may be assigned to the MAC address of the STA 120, or a plurality (e.g., a range) of prefixes may be assigned to the MAC address of the STA 120. As such, when the STA 120 transmits a transmission frame to the AP 110, wherein the transmission frame includes a prefix, the AP 110 may process the prefix included in the transmission frame to determine the MAC address of the STA 120 (e.g., the real MAC of the STA 120 to which the prefix is assigned) and therefore the identity of the transmitting STA 120 and/or the user of the STA 120. Utilizing a range of prefixes instead of one prefix may enable the STA 120 to transmit transmission frames with different prefixes or change prefixes, thereby making it more difficult for an attacker to detect the identity (e.g., the real MAC address) of the STA 120. In some embodiments, the prefix may have a predetermined fix length (e.g., may include a predetermined number of bits) or may be dynamic in length, and may be based at least in part on the real MAC address of the STA 120.

At block 213, the AP 110 may authenticate the STA 120. Authenticating the STA 120 may include determining whether open authentication is supported by the STA 120. For example, if there is no open authentication (e.g., Connected & Authenticated mode), then the STA 120 may be required to be authenticated by the AP 110 using the real MAC address of the STA 120, as set forth by block 214. Alternatively, if there is open authentication (e.g., Connected and Open Authentication mode), then the STA 120 may be required to be authenticated by the AP 110 using encryption processes, as set forth in block 216. As with other disclosed steps, this step of authentication may be performed at various points within the process flow 200, such as earlier in the process flow.

At block 214, the AP 110 may use the MAC address of the STA 120 indicated by the identity response message to authenticate the STA 120. In some embodiments, authenticating the STA 120 includes determining the MAC address of the STA 120, comparing the determined MAC address to an expected MAC address, and validating the determined MAC address based on determining at least a partial match between the determined MAC address and the expected MAC address. In some embodiments, the expected MAC address may include a plurality of MAC addresses (e.g., a range of MAC addresses) that are authenticated and/or associated with positive validation of the determined MAC address and/or an associated user identity, device identity, and/or the like. Further, upon authentication of the STA 120, the AP 110 may establish a secure communication connection 218 between the AP 110 and the STA 120 based on a Wi-Fi Protected Access (WPA) procedures, 802.11i procedures, and/or the like. In this manner, the AP 110 may operate in a "Connected & Authenticated" mode.

At block 216, the AP 110 may not use the MAC address of the STA 120 to authenticate the STA 120; instead, the AP 110 may use the one or more DH parameters included in the indication response message received from the STA 120. The DH parameters may indicate an encryption key to be used by both the AP 110 and the STA 120 for transmitting and/or receiving transmissions between the AP 110 and the STA 120. For example, the encryption key may be used to ensure a secure communication connection 218 between the AP 110 and the STA 120 for securely transmitting the prefix at block 212.

At block 220, the AP 110 may transmit to the STA 120, via the secure communication connection 218, the prefix and/or the range of prefixes assigned to the STA 120 (e.g., the prefix and/or the range of prefixes mapped to the real MAC address of the STA 120), as may have been generated at block 212. The prefix and/or range of prefixes indicates to the STA 120 which prefix(es) is to be included in transmissions to the AP 110. Again, a prefix included in a transmission from a transmitting STA 120 to the AP 110 may be used by the AP 110 to identify, based on a mapping of the prefix to the real MAC address of the transmitting STA 120, the real MAC address of the transmitting STA 120 as described herein.

When a range of prefixes is transmitted to the STA 120, the STA 120 may be enabled to select a prefix from the range of prefixes. In some embodiments, the STA 120 may use the same selected prefix for multiple transmissions. Alternatively, the STA 120 may use a different prefix for each transmission. For example, a first prefix may be selected from a range of prefixes for a first transmission, while a second prefix may be selected from the range of prefixes for a second transmission.

At block 222, the STA 120 may generate and transmit a probe request to the AP 110. The probe request may include a request to establish a Wi-Fi communication connection with the one or more networks 130 via the AP 110. For example, the probe request may include allocation information (e.g., frequency band allocation information, scheduling information, and/or the like), device identification information, and/or the like. Further, the probe request may include a selected prefix and/or an acknowledgement of a prefix that is to be included in transmission frames by the STA 120 when transmitting transmission frames to the AP 110.

The AP 110 may then receive the probe request from the STA 120. In some embodiments, the AP 110 may update a mapping table based on the acknowledgement and/or selection of a prefix to be used when transmitting transmission frames between the STA 120 and the AP 110. In this manner, the AP 110 may be aware of which prefix is associated with the STA 120 so that the AP 110 may identify which transmission frames are being transmitted from and/or to the correct STA 120. Based on the associations between prefixes and real MAC addresses, the AP 110 may route and/or distribute incoming and/or outgoing traffic (e.g., transmission frames, and/or the like) to and/or from the correct STAs 120.

At block 224, the STA 120 may then begin to transmit one or more transmission frames to the AP 110. In accordance with embodiments described herein, each transmission frame may include the prefix agreed upon by the AP 110 and the STA 120. In some embodiments, the transmission frame may include a random MAC address portion and a prefix portion, where the prefix portion precedes the random MAC address portion (e.g., where the prefix portion is received and/or processed by the AP 110 prior to the random MAC address portion). Each of the random MAC address portion and the prefix portion of the transmission frame (and therefore the transmission frame as a whole) may be generated by the STA 120. The transmission frame may also include any information (e.g., data packets, a destination device and/or location, allocation information, device information, and/or the like) that the STA 120 desires to transmit via the one or more networks 130.

In some embodiments, the prefix portion may include a locally-administered bit to indicate whether a MAC address randomization has been administered at the STA 120 and is therefore included in the random MAC address portion of the transmission frame. For example, a locally-administered bit set to "1" may indicate that the STA 120 has executed a MAC address randomization operation, whereas a locally-administered bit set to "0" may indicate that the STA has not executed a MAC address randomization operation. The prefix portion may further include a unicast/multicast (e.g., broadcast) bit to indicate which type of transmission means the STA 120 desires to use to transmit the transmission frame. For example, a unicast/multicast bit set to "1" may indicate that the STA 120 desires to transmit a transmission frame directly to other STAs 120 within a predetermined proximity and/or network domain, whereas a unicast/multicast bit set to "0" may indicate that the STA desires to transmit a transmission frame outside of a predetermined proximity and/or network domain (e.g., via the one or more communication networks 130 and using the AP 110).

In some embodiments, the random MAC address portion may include a random MAC address of the STA 120, which in some embodiments may be generated by the STA 120 based at least in part on the prefix. For example, a random number may be generated by the STA 120 in a predetermined format and/or of a predetermined size (e.g., 3 bytes) using a predetermined algorithm specified by a prefix included in the prefix portion. In some embodiments, the STA 120 may determine, based at least in part on a local policy, preferences, settings, and/or the like, whether to generate a different random MAC address for each transmission frame or a single random MAC address that may be used for the duration of the communication connection, a predetermined number of transmission frames, and/or the like. Generation of random MAC addresses may further be based on time of day, location (e.g., proximity to the AP 110), traffic congestion, and/or the like.

In some embodiments, the STA 120 may encrypt and/or encode each transmission of a transmission frame. Alternatively, the STA 120 may fill a portion of the transmission frame with random numbers.

At block 226, the AP 110 may receive and/or process the one or more transmission frames. Upon receipt of a transmission frame, the AP 110 may process the prefix portion to determine the states of the locally-administered bit and the unicast/multicast bit.

At block 228, if the AP 110 determines that the locally-administered bit is set to "1," indicating that the random MAC address portion of the transmission frame includes a random MAC address, and that the unicast/multicast bit is set to "0," indicating that the transmission frame is destined to outside of the network domain associated with the AP 110 (e.g., is destined to be transmitted by the AP 110 via the one or more communication networks 130), then the AP 110 may identify and/or determine the prefix associated with and/or included in the prefix portion of the transmission frame. The AP 110 may then use the prefix to identify the real MAC address of the STA 120 by identifying the prefix in the mapping table and identifying the real MAC address of the STA 120 that is associated with (e.g., mapped to, corresponding to) the prefix in the mapping table. Alternatively, the AP 110 may map (e.g., identify) the random MAC address to the real MAC address of the STA 120 using the prefix.

At block 230, the AP 110 may use the identified real MAC address of the STA 120 and replace the random MAC address in the random MAC address portion of the transmission frame with the real MAC address of the STA 120. In some embodiments, replacing the random MAC address in the random MAC address portion of the transmission frame with the real MAC address of the STA 120 may include generating a second transmission frame, where the second transmission frame includes the real MAC address of the STA 120. The AP 110 may then transmit (e.g., forward) the transmission frame including the real MAC address of the STA 120 (e.g., the second transmission frame) to its desired destination via the one or more communication networks 130.

At block 232, if the AP 110 alternatively determines that the locally-administered bit is set to "0," indicating that the random MAC address portion of the transmission frame does not include a random MAC address, and/or that the unicast/multicast bit is set to "1," indicating that the transmission frame is not destined to outside of the network domain associated with the AP 110 (e.g., is destined to be transmitted by the AP 110 via the one or more communication networks 130), the AP 110 may simply transmit (e.g., forward) the transmission frame to its desired destination. In some embodiments, the AP 110 may transmit the transmission frame using the real MAC address of the STA 120. The AP 110 may also encode the real MAC address into the transmission frame prior to transmitting the transmission frame.

At block 234 (and/or concurrently with processes related to one or more of the blocks 204-210), if the AP 110 determined at block 204 or block 210 that either the AP 110 and/or the STA 120 do not support AP-administered MAC randomization, then the STA 120 may determine whether locally-administered MAC randomization is supported by the STA 120 based on an analysis of preferences, settings, device information, and/or the like. If it is determined by the STA 120 that the STA 120 does not support locally-administered MAC randomization, then the processes associated with block 232 may be executed by the AP 110 and/or the STA 120.

At block 236, however, if it is determined by the STA 120 that the STA 120 does indeed support locally-administered MAC randomization (e.g., Not Connected mode), the STA 120 may generate a transmission frame including a random MAC address of a predetermined length (e.g., 48 bits) including a prefix portion (e.g., a locally-administered bit set to "1" and a unicast/multicast bit set to "0"), for transmission to the AP 110. The transmission frame may then be transmitted to the AP 110. In some embodiments, the transmission frame may be transmitted as a periodic probe request. Because the STA 120 has not established a communication connection with the AP 110, there is no risk of collision with other transmission frames and/or service breakdowns. Alternatively, if the STA 120 does not support locally-administered MAC randomization, the frames are processed according to block 232.

If any transmission attempt executed by the AP 110 and/or the STA 120 fails, the AP 110 and/or the STA 120 may reattempt to transmit the failed transmission.

While the process flow 200 provides a hybrid flow accommodating AP or locally administered MAC address randomization. Further, the process flow 200 accommodates each of Connected & Authenticated, Connected & Open Authentication, as well as Not Connected modes, though it will be appreciated that each mode may be independently implemented via a combination of blocks discussed herein with reference to the process flow 200 of FIGS. 2A and 2B.

Figure 3:
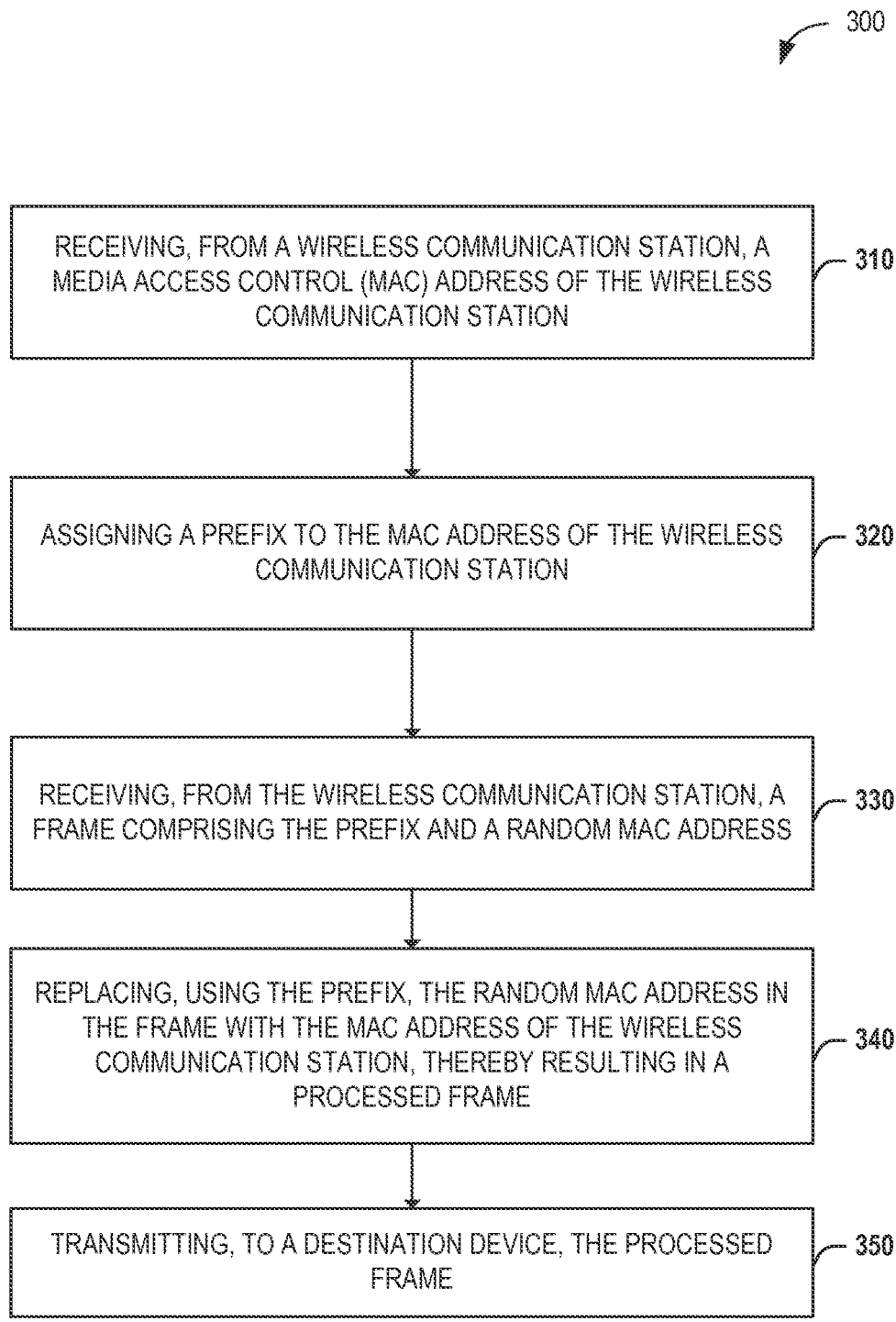
FIG. 3 depicts an example process flow for utilizing MAC randomization, according to one or more example embodiments of the disclosure.

FIG. 3 illustrates an example process flow 300 for utilizing AP administered MAC randomization, as may be implemented by an AP. At block 310, the process includes receiving, at an access point and from a wireless communication station, a media access control (MAC) address of the wireless communication station. At block 320, the process includes assigning, at the access point, a prefix to the MAC address of the wireless communication station. At block 330, the process includes receiving, at the access point and from the wireless communication station, a frame comprising the prefix and a random MAC address. At block 340, the process includes replacing, at the access point and using the prefix, the random MAC address in the frame with the MAC address of the wireless communication station, thereby resulting in a processed frame. At block 350, the process includes transmitting, at the access point and to a destination device, the processed frame.

Figure 4:
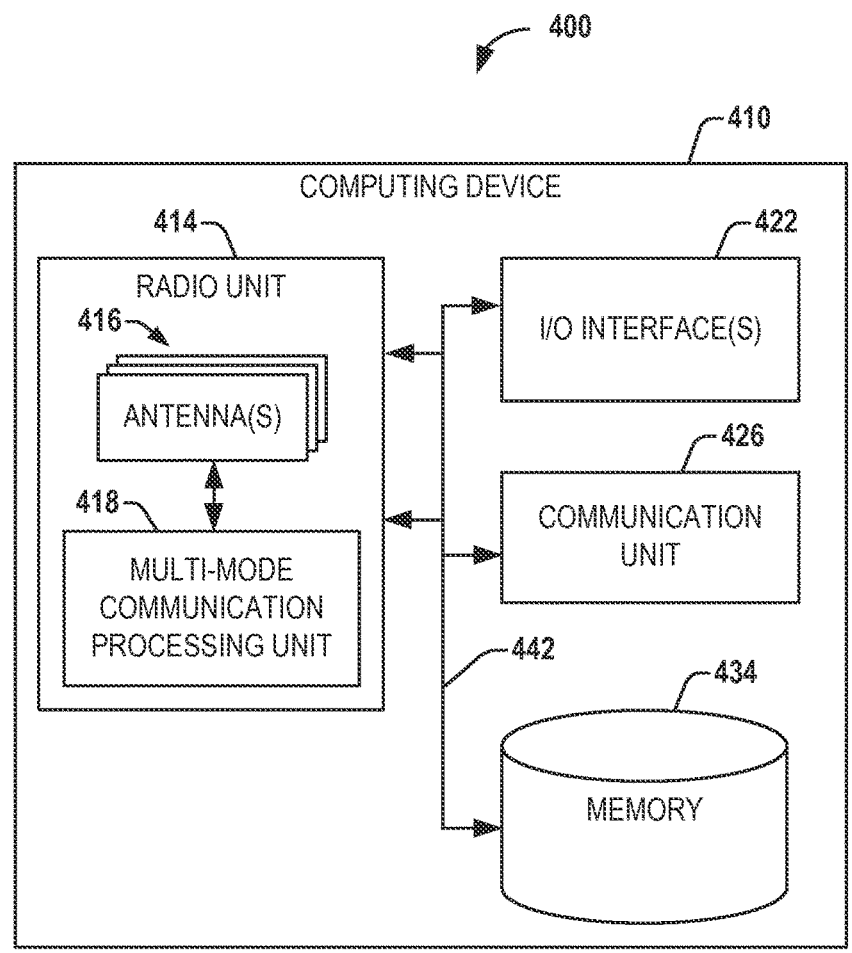
FIG. 4 depicts an example of a communication device, according to one or more example embodiments of the disclosure.
Figure 5:
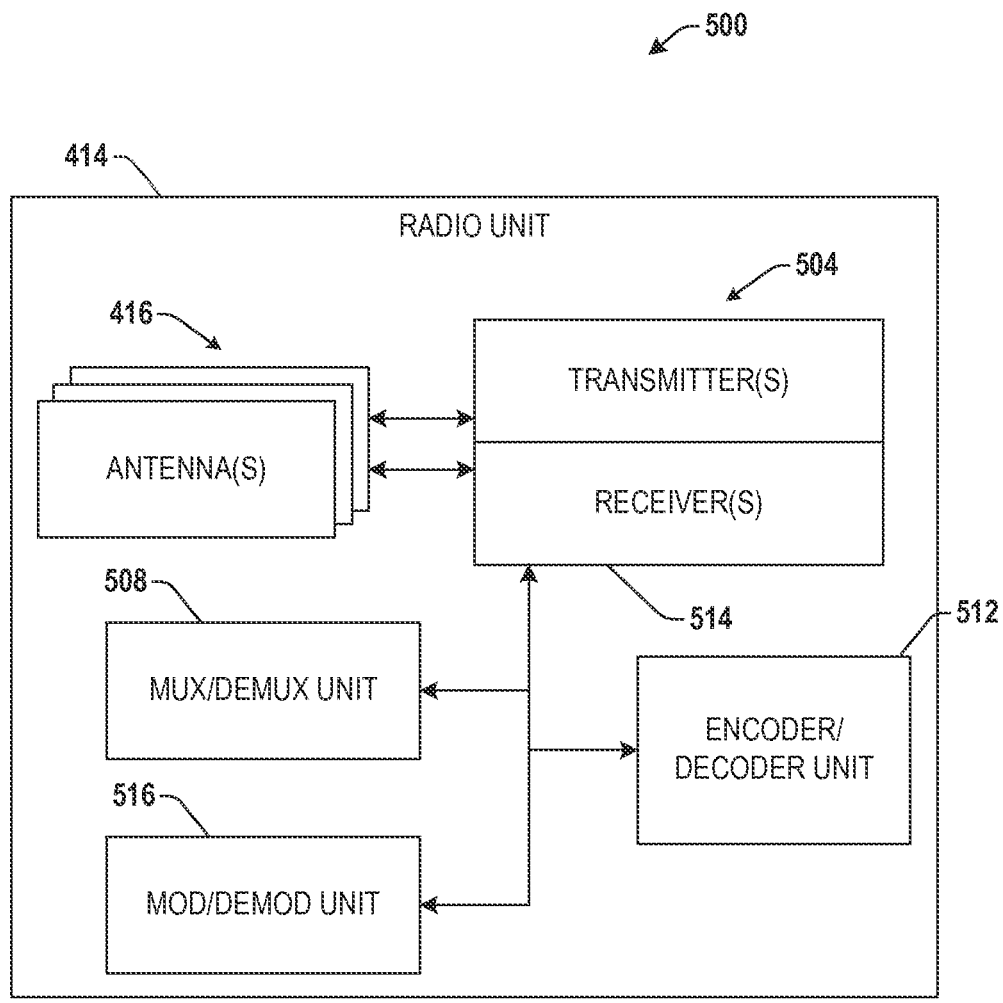
FIG. 5 depicts an example of a radio unit, according to one or more example embodiments of the disclosure.

FIG. 4 illustrates a block-diagram of an example embodiment 400 of a computing device 410 that can operate in accordance with at least certain aspects of the disclosure. In one aspect, the computing device 410 can operate as a wireless device and can embody or can comprise an access point (e.g., access point 110 (AP 110)), a mobile computing device (e.g., wireless station 120 (STA 120)), a receiving and/or transmitting station, and/or other types of communication device that can transmit and/or receive wireless communications in accordance with this disclosure. To permit wireless communication, including dynamic bit mapping techniques as described herein, the computing device 410 includes a radio unit 414 and a communication unit 426. In certain implementations, the communication unit 426 can generate data packets or other types of information blocks via a network stack, for example, and can convey data packets or other types of information block to the radio unit 414 for wireless communication. In one embodiment, the network stack (not shown) can be embodied in or can constitute a library or other types of programming module, and the communication unit 426 can execute the network stack in order to generate a data packet or another type of information block (e.g., a trigger frame). Generation of a data packet or an information block can include, for example, generation of control information (e.g., checksum data, communication address(es)), traffic information (e.g., payload data), scheduling information (e.g., station information, allocation information, and/or the like), an indication, and/or formatting of such information into a specific packet header and/or preamble.

As illustrated, the radio unit 414 can include one or more antennas 416 and a multi-mode communication processing unit 418. In certain embodiments, the antenna(s) 416 can be embodied in or can include directional or omnidirectional antennas, including, for example, dipole antennas, monopole antennas, patch antennas, loop antennas, microstrip antennas or other types of antennas suitable for transmission of RF signals. In addition, or in other embodiments, at least some of the antenna(s) 416 can be physically separated to leverage spatial diversity and related different channel characteristics associated with such diversity. In addition or in other embodiments, the multi-mode communication processing unit 418 can process at least wireless signals in accordance with one or more radio technology protocols and/or modes (such as MIMO, MU-MIMO (e.g., multiple user-MIMO), single-input-multiple-output (SIMO), multiple-input-single-output (MISO), and the like. Each of such protocol(s) can be configured to communicate (e.g., transmit, receive, or exchange) data, metadata, and/or signaling over a specific air interface. The one or more radio technology protocols can include 3GPP UMTS; LTE; LTE-A; Wi-Fi protocols, such as those of the Institute of Electrical and Electronics Engineers (IEEE) 802.11 family of standards; Worldwide Interoperability for Microwave Access (WiMAX); radio technologies and related protocols for ad hoc networks, such as Bluetooth or ZigBee; other protocols for packetized wireless communication; or the like). The multi-mode communication processing unit 418 also can process non-wireless signals (analogic, digital, a combination thereof, or the like). In one embodiment (e.g., example embodiment 500 shown in FIG. 5), the multi-mode communication processing unit 418 can comprise a set of one or more transmitters/receivers 504, and components therein (amplifiers, filters, analog-to-digital (A/D) converters, etc.), functionally coupled to a multiplexer/demultiplexer (mux/demux) unit 508, a modulator/demodulator (mod/demod) unit 516 (also referred to as modem 516), and an encoder/decoder unit 512 (also referred to as codec 512). Each of the transmitter(s)/receiver(s) can form respective transceiver(s) that can transmit and receive wireless signals (e.g., streams, electromagnetic radiation) via the one or more antennas 416. It should be appreciated that in other embodiments, the multi-mode communication processing unit 418 can include other functional elements, such as one or more sensors, a sensor hub, an offload engine or unit, a combination thereof, or the like.

Electronic components and associated circuitry, such as mux/demux unit 508, codec 512, and modem 516 can permit or facilitate processing and manipulation, e.g., coding/decoding, deciphering, and/or modulation/demodulation, of signal(s) received by the computing device 410 and signal(s) to be transmitted by the computing device 410. In one aspect, as described herein, received and transmitted wireless signals can be modulated and/or coded, or otherwise processed, in accordance with one or more radio technology protocols. Such radio technology protocol(s) can include 3GPP UMTS; 3GPP LTE; LTE-A; Wi-Fi protocols, such as IEEE 802.11 family of standards (IEEE 802.ac, IEEE 802.ax, and the like); WiMAX; radio technologies and related protocols for ad hoc networks, such as Bluetooth or ZigBee; other protocols for packetized wireless communication; or the like.

The electronic components in the described communication unit, including the one or more transmitters/receivers 504, can exchange information (e.g., data packets, allocation information, data, metadata, code instructions, signaling and related payload data, multicast frames, combinations thereof, or the like) through a bus 514, which can embody or can comprise at least one of a system bus, an address bus, a data bus, a message bus, a reference link or interface, a combination thereof, or the like. Each of the one or more receivers/transmitters 504 can convert signal from analog to digital and vice versa. In addition or in the alternative, the receiver(s)/transmitter(s) 504 can divide a single data stream into multiple parallel data streams, or perform the reciprocal operation. Such operations may be conducted as part of various multiplexing schemes. As illustrated, the mux/demux unit 508 is functionally coupled to the one or more receivers/transmitters 504 and can permit processing of signals in time and frequency domain. In one aspect, the mux/demux unit 508 can multiplex and demultiplex information (e.g., data, metadata, and/or signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition or in the alternative, in another aspect, the mux/demux unit 508 can scramble and spread information (e.g., codes) according to most any code, such as Hadamard-Walsh codes, Baker codes, Kasami codes, polyphase codes, and the like. The modem 516 can modulate and demodulate information (e.g., data, metadata, signaling, or a combination thereof) according to various modulation techniques, such as OFDMA, OCDA, ECDA, frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like). In addition, processor(s) that can be included in the computing device 410 (e.g., processor(s) included in the radio unit 414 or other functional element(s) of the computing device 410) can permit processing data (e.g., symbols, bits, or chips) for multiplexing/demultiplexing, modulation/demodulation (such as implementing direct and inverse fast Fourier transforms) selection of modulation rates, selection of data packet formats, inter-packet times, and the like.

The codec 512 can operate on information (e.g., data, metadata, signaling, or a combination thereof) in accordance with one or more coding/decoding schemes suitable for communication, at least in part, through the one or more transceivers formed from respective transmitter(s)/receiver(s) 504. In one aspect, such coding/decoding schemes, or related procedure(s), can be retained as a group of one or more computer-accessible instructions (computer-readable instructions, computer-executable instructions, or a combination thereof) in one or more memory devices 434 (referred to as memory 434). In a scenario in which wireless communication among the computing device 410 and another computing device (e.g., an access point 110, a user device 120, an STA 120, and/or other types of user equipment) utilizes MU-MIMI, MIMO, MISO, SIMO, or SISO operation, the codec 512 can implement at least one of space-time block coding (STBC) and associated decoding, or space-frequency block (SFBC) coding and associated decoding. In addition or in the alternative, the codec 512 can extract information from data streams coded in accordance with spatial multiplexing scheme. In one aspect, to decode received information (e.g., data, metadata, signaling, or a combination thereof), the codec 512 can implement at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. The codec 512 can utilize, at least in part, mux/demux component 508 and mod/demod component 516 to operate in accordance with aspects described herein.

The computing device 410 can operate in a variety of wireless environments having wireless signals conveyed in different electromagnetic radiation (EM) frequency bands and/or subbands. To at least such end, the multi-mode communication processing unit 418 in accordance with aspects of the disclosure can process (code, decode, format, etc.) wireless signals within a set of one or more EM frequency bands (also referred to as frequency bands) comprising one or more of radio frequency (RF) portions of the EM spectrum, microwave portion(s) of the EM spectrum, or infrared (IR) portion of the EM spectrum. In one aspect, the set of one or more frequency bands can include at least one of (i) all or most licensed EM frequency bands, (such as the industrial, scientific, and medical (ISM) bands, including the 2.4 GHz band or the 5 GHz bands); or (ii) all or most unlicensed frequency bands (such as the 60 GHz band) currently available for telecommunication.

The computing device 410 can receive and/or transmit information encoded and/or modulated or otherwise processed in accordance with aspects of the present disclosure. To at least such an end, in certain embodiments, the computing device 410 can acquire or otherwise access information, wirelessly via the radio unit 414 (also referred to as radio 414), where at least a portion of such information can be encoded and/or modulated in accordance with aspects described herein. More specifically, for example, the information can include prefixes, data packets, and/or physical layer headers (e.g., preambles and included information such as allocation information), a signal, and/or the like in accordance with embodiments of the disclosure, such as those shown in FIGS. 1-3.

The memory 434 can contain one or more memory elements having information suitable for processing information received according to a predetermined communication protocol (e.g., IEEE 802.11ac or IEEE 802.11ax). While not shown, in certain embodiments, one or more memory elements of the memory 434 can include computer-accessible instructions that can be executed by one or more of the functional elements of the computing device 410 in order to implement at least some of the functionality for MAC address randomization techniques described herein, including processing of information communicated (e.g., encoded, modulated, and/or arranged) in accordance with aspect of the disclosure. One or more groups of such computer-accessible instructions can embody or can constitute a programming interface that can permit communication of information (e.g., data, metadata, and/or signaling) between functional elements of the computing device 410 for implementation of such functionality.

In addition, in the illustrated computing device 410, a bus architecture 442 (also referred to as bus 442) can permit the exchange of information (e.g., data, metadata, and/or signaling) between two or more of (i) the radio unit 414 or a functional element therein, (ii) at least one of the I/O interface(s) 422, (iii) the communication unit 426, or (iv) the memory 434. In addition, one or more application programming interfaces (APIs) (not depicted in FIG. 4) or other types of programming interfaces can permit the exchange of information (e.g., trigger frames, streams, data packets, allocation information, data and/or metadata) between two or more of the functional elements of the computing device 410. At least one of such API(s) can be retained or otherwise stored in the memory 434. In certain embodiments, it should be appreciated that at least one of the API(s) or other programming interfaces can permit the exchange of information within components of the communication unit 426. The bus 442 also can permit a similar exchange of information.

Figure 6:
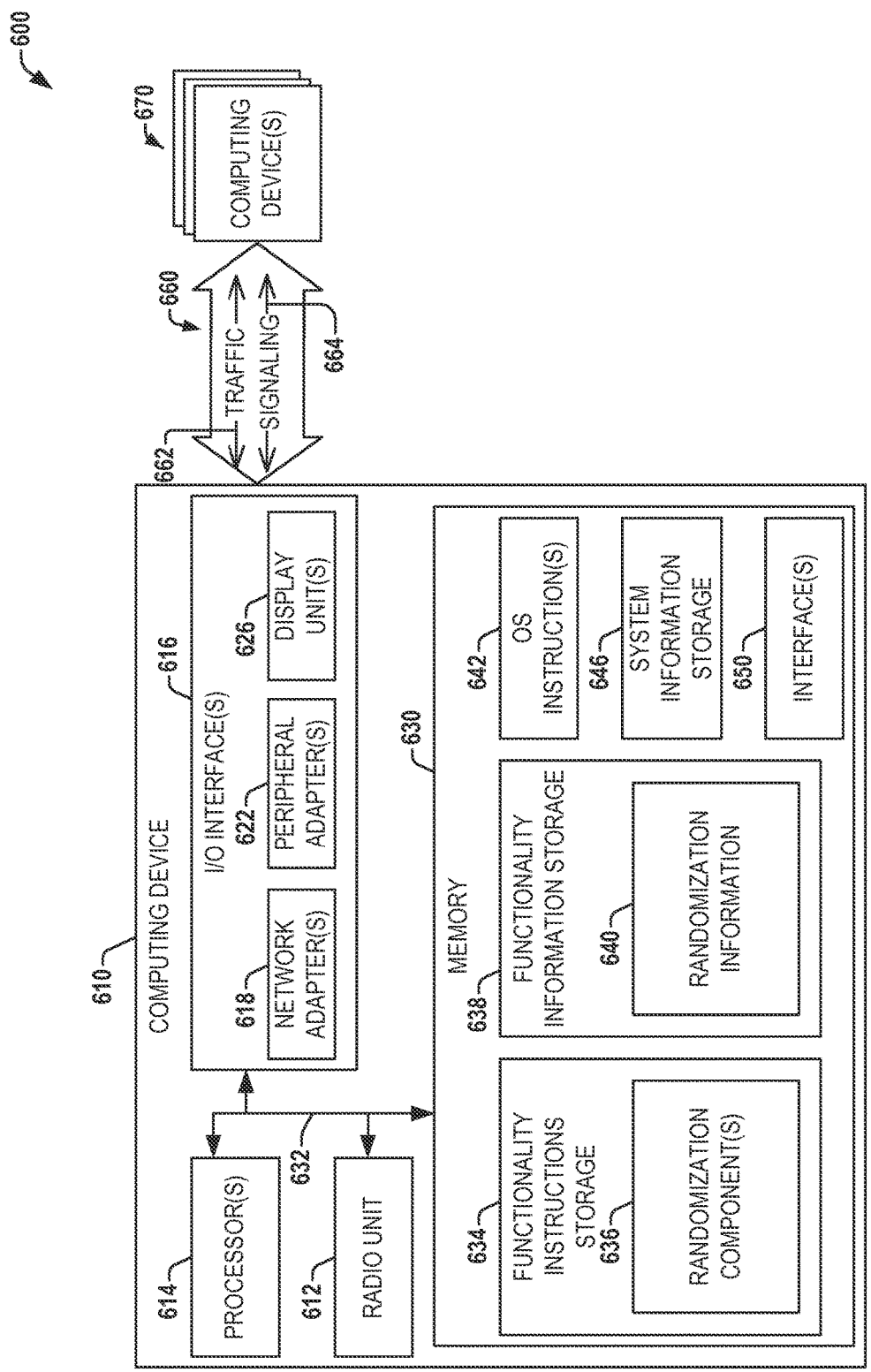
FIG. 6 depicts an example of a computational environment, according to one or more example embodiments of the disclosure.

FIG. 6 illustrates an example of a computational environment 600 for executing MAC address randomization techniques in accordance with one or more aspects of the disclosure. The example computational environment 600 is only illustrative and is not intended to suggest or otherwise convey any limitation as to the scope of use or functionality of such computational environments' architecture. In addition, the computational environment 600 should not be interpreted as having any dependency or requirement relating to any one or combination of components illustrated in this example computational environment. The illustrative computational environment 600 can embody or can include, for example, the computing device 410, an access point 110, a user device 120, and/or any other computing device that can implement or otherwise leverage the MAC address randomization techniques described herein.

The computational environment 600 represents an example of a software implementation of the various aspects or features of the disclosure in which the processing or execution of operations described in connection with MAC address randomization techniques described herein, including processing of information communicated (e.g., encoded, modulated, and/or arranged) in accordance with this disclosure, can be performed in response to execution of one or more software components at the computing device 610. It should be appreciated that the one or more software components can render the computing device 610, or any other computing device that contains such components, a particular machine for MAC address randomization techniques described herein, including processing of information encoded, modulated, and/or arranged in accordance with aspects described herein, among other functional purposes. A software component can be embodied in or can comprise one or more computer-accessible instructions, e.g., computer-readable and/or computer-executable instructions. At least a portion of the computer-accessible instructions can embody one or more of the example techniques disclosed herein. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 610 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 610 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with MAC address randomization techniques, including processing of information communicated (e.g., encoded, modulated, and/or arranged) in accordance with features described herein, can comprise personal computers; server computers; laptop devices; handheld computing devices, such as mobile tablets; wearable computing devices; and multiprocessor systems. Additional examples can include set top boxes, programmable consumer electronics, network PCs, minicomputers, mainframe computers, blade computers, programmable logic controllers, distributed computing environments that comprise any of the above systems or devices, and the like.

As illustrated, the computing device 610 can comprise one or more processors 614, one or more input/output (I/O) interfaces 616, a memory 630, and a bus architecture 632 (also termed bus 632) that functionally couples various functional elements of the computing device 610. The bus 632 can include at least one of a system bus, a memory bus, an address bus, or a message bus, and can permit exchange of information (data, metadata, and/or signaling) between the processor(s) 614, the I/O interface(s) 616, and/or the memory 630, or respective functional element therein. In certain scenarios, the bus 632 in conjunction with one or more internal programming interfaces 650 (also referred to as interface(s) 650) can permit such exchange of information. In scenarios in which processor(s) 614 include multiple processors, the computing device 610 can utilize parallel computing.

The I/O interface(s) 616 can permit or otherwise facilitate communication of information between the computing device and an external device, such as another computing device, e.g., a network element or an end-user device. Such communication can include direct communication or indirect communication, such as exchange of information between the computing device 610 and the external device via a network or elements thereof. As illustrated, the I/O interface(s) 616 can comprise one or more of network adapter(s) 618, peripheral adapter(s) 622, and display unit(s) 626. Such adapter(s) can permit or facilitate connectivity between the external device and one or more of the processor(s) 614 or the memory 630. In one aspect, at least one of the network adapter(s) 618 can couple functionally the computing device 610 to one or more computing devices 670 via one or more traffic and signaling pipes 660 that can permit or facilitate exchange of traffic 662 and signaling 664 between the computing device 610 and the one or more computing devices 670. Such network coupling provided at least in part by the at least one of the network adapter(s) 618 can be implemented in a wired environment, a wireless environment, or both. The information that is communicated by the at least one network adapter can result from implementation of one or more operations in a method of the disclosure. Such output can be any form of visual representation, including, but not limited to, textual, graphical, animation, audio, tactile, and the like. In certain scenarios, each access point 110, user device 120, station, and/or other device can have substantially the same architecture as the computing device 610. In addition or in the alternative, the display unit(s) 626 can include functional elements (e.g., lights, such as light-emitting diodes; a display, such as liquid crystal display (LCD), combinations thereof, or the like) that can permit control of the operation of the computing device 610, or can permit conveying or revealing operational conditions of the computing device 610.

In one aspect, the bus 632 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card Industry Association (PCMCIA) bus, Universal Serial Bus (USB), and the like. The bus 632, and all buses described herein can be implemented over a wired or wireless network connection and each of the subsystems, including the processor(s) 614, the memory 630 and memory elements therein, and the I/O interface(s) 616 can be contained within one or more remote computing devices 670 at physically separate locations, connected through buses of this form, in effect implementing a fully distributed system.

The computing device 610 can comprise a variety of computer-readable media. Computer readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 610, and can comprise, for example, both volatile and non-volatile media, and removable and/or non-removable media. In one aspect, the memory 630 can comprise computer-readable media in the form of volatile memory, such as random access memory (RAM), and/or non-volatile memory, such as read only memory (ROM).

The memory 630 can comprise functionality instructions storage 634 and functionality information storage 638. The functionality instructions storage 634 can comprise computer-accessible instructions that, in response to execution (by at least one of the processor(s) 614), can implement one or more of the functionalities of the disclosure. The computer-accessible instructions can embody or can comprise one or more software components illustrated as randomization component(s) 636. In one scenario, execution of at least one component of the randomization component(s) 636 can implement one or more of the techniques disclosed herein. For instance, such execution can cause a processor that executes the at least one component to carry out a disclosed example method. It should be appreciated that, in one aspect, a processor of the processor(s) 614 that executes at least one of the randomization component(s) 636 can retrieve information from or retain information in a memory element 640 in the functionality information storage 638 in order to operate in accordance with the functionality programmed or otherwise configured by the randomization component(s) 636. Such information can include at least one of code instructions, information structures, or the like. At least one of the one or more interfaces 650 (e.g., application programming interface(s)) can permit or facilitate communication of information between two or more components within the functionality instructions storage 634. The information that is communicated by the at least one interface can result from implementation of one or more operations in a method of the disclosure. In certain embodiments, one or more of the functionality instructions storage 634 and the functionality information storage 638 can be embodied in or can comprise removable/non-removable, and/or volatile/non-volatile computer storage media.

At least a portion of at least one of the randomization component(s) 636 or randomization information 640 can program or otherwise configure one or more of the processors 614 to operate at least in accordance with the functionality described herein. One or more of the processor(s) 614 can execute at least one of such components and leverage at least a portion of the information in the storage 638 in order to provide MAC address randomization techniques in accordance with one or more aspects described herein. More specifically, yet not exclusively, execution of one or more of the component(s) 636 can permit transmitting and/or receiving information at the computing device 610, as described in connection with FIGS. 1-3, for example.

It should be appreciated that, in certain scenarios, the functionality instruction(s) storage 634 can embody or can comprise a computer-readable non-transitory storage medium having computer-accessible instructions that, in response to execution, cause at least one processor (e.g., one or more of processor(s) 614) to perform a group of operations comprising the operations or blocks described in connection with the disclosed methods.

In addition, the memory 630 can comprise computer-accessible instructions and information (e.g., data and/or metadata) that permit or facilitate operation and/or administration (e.g., upgrades, software installation, any other configuration, or the like) of the computing device 610. Accordingly, as illustrated, the memory 630 can comprise a memory element 642 (labeled OS instruction(s) 642) that contains one or more program modules that embody or include one or more OSs, such as Windows operating system, Unix, Linux, Symbian, Android, Chromium, and substantially any OS suitable for mobile computing devices or tethered computing devices. In one aspect, the operational and/or architecture complexity of the computing device 610 can dictate a suitable OS. The memory 630 also comprises a system information storage 646 having data and/or metadata that permits or facilitate operation and/or administration of the computing device 610. Elements of the OS instruction(s) 642 and the system information storage 646 can be accessible or can be operated on by at least one of the processor(s) 614.

It should be recognized that while the functionality instructions storage 634 and other executable program components, such as the operating system instruction(s) 642, are illustrated herein as discrete blocks, such software components can reside at various times in different memory components of the computing device 610, and can be executed by at least one of the processor(s) 614. In certain scenarios, an implementation of the randomization component(s) 636 can be retained on or transmitted across some form of computer readable media.

The computing device 610 and/or one of the computing device(s) 670 can include a power supply (not shown), which can power up components or functional elements within such devices. The power supply can be a rechargeable power supply, e.g., a rechargeable battery, and it can include one or more transformers to achieve a power level suitable for operation of the computing device 610 and/or one of the computing device(s) 670, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 618) to connect operationally to the conventional power grid. In another aspect, the power supply can include an energy conversion component, such as a solar panel, to provide additional or alternative power resources or autonomy for the computing device 610 and/or one of the computing device(s) 670.

The computing device 610 can operate in a networked environment by utilizing connections to one or more remote computing devices 670. As an illustration, a remote computing device can be a personal computer, a portable computer, a server, a router, a network computer, a peer device or other common network node, and so on. As described herein, connections (physical and/or logical) between the computing device 610 and a computing device of the one or more remote computing devices 670 can be made via one or more traffic and signaling pipes 660, which can comprise wireline link(s) and/or wireless link(s) and several network elements (such as routers or switches, concentrators, servers, and the like) that form a local area network (LAN) and/or a wide area network (WAN). Such networking environments are conventional and commonplace in dwellings, offices, enterprise-wide computer networks, intranets, local area networks, and wide area networks.

Figure 7:
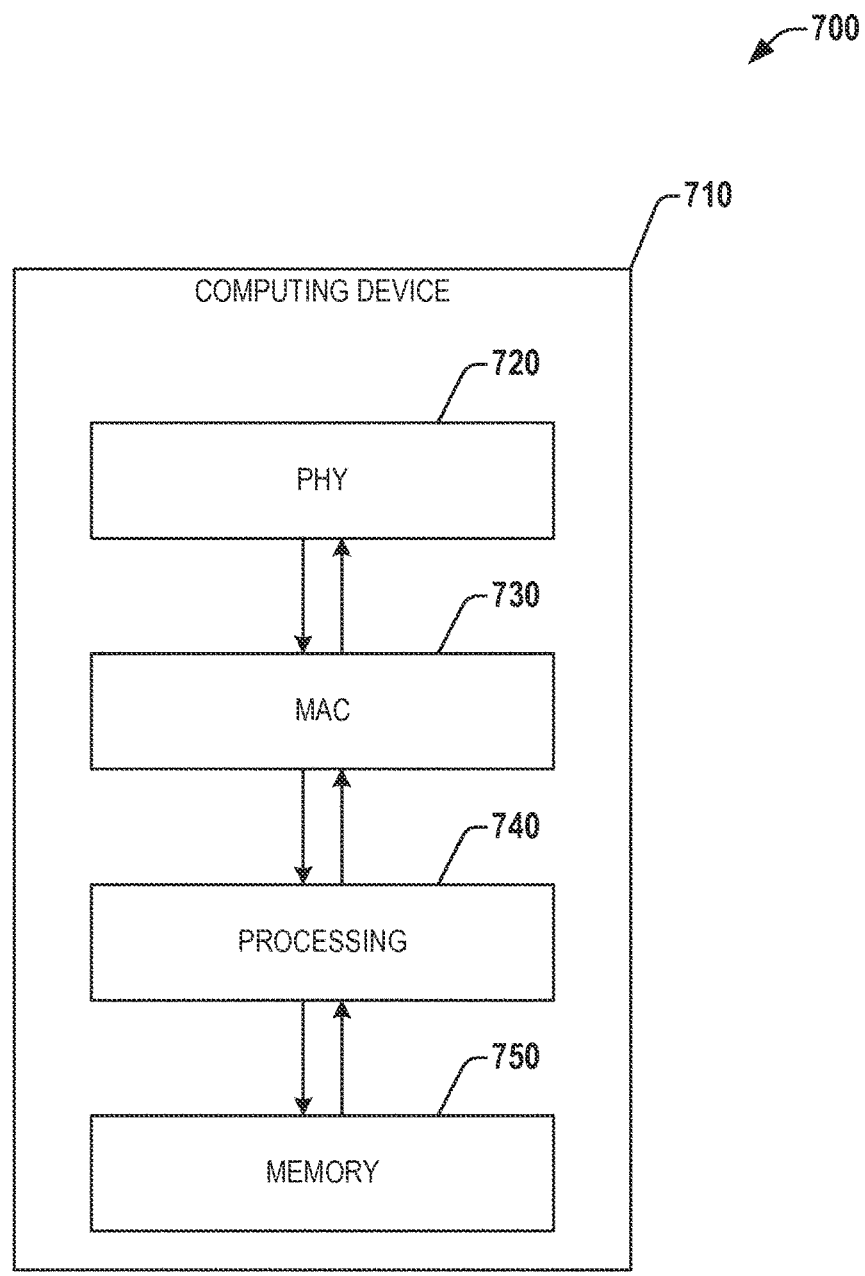
FIG. 7 depicts another example of a communication device, according to one or more example embodiments of the disclosure.

FIG. 7 presents another example embodiment 700 of a computing device 710 in accordance with one or more embodiments of the disclosure. In certain implementations, the computing device 710 can be a HEW-compliant device that may be configured to communicate with one or more other HEW devices and/or other types of communication devices, such as legacy communication devices. HEW devices and legacy devices also may be referred to as HEW stations (STAs) and legacy STAs, respectively. In one implementation, the computing device 710 can operate as an access point 110, a user device 120, and/or another device. As illustrated, the computing device 710 can include, among other things, physical layer (PHY) circuitry 720 and medium-access-control layer (MAC) circuitry 730. In one aspect, the PHY circuitry 710 and the MAC circuitry 730 can be HEW compliant layers and also can be compliant with one or more legacy IEEE 802.11 standards. In one aspect, the MAC circuitry 730 can be arranged to configure physical layer converge protocol (PLCP) protocol data units (PPDUs) and arranged to transmit and receive PPDUs, among other things. In addition or in other embodiments, the computing device 710 also can include other hardware processing circuitry 740 (e.g., one or more processors) and one or more memory devices 750 configured to perform the various operations described herein.

In certain embodiments, the MAC circuitry 730 can be arranged to contend for a wireless medium during a contention period to receive control of the medium for the HEW control period and configure an HEW PPDU. In addition or in other embodiments, the PHY 720 can be arranged to transmit the HEW PPDU. The PHY circuitry 720 can include circuitry for modulation/demodulation, upconversion/downconversion, filtering, amplification, etc. As such, the computing device 710 can include a transceiver to transmit and receive data such as HEW PPDU. In certain embodiments, the hardware processing circuitry 740 can include one or more processors. The hardware processing circuitry 740 can be configured to perform functions based on instructions being stored in a memory device (e.g., RAM or ROM) or based on special purpose circuitry. In certain embodiments, the hardware processing circuitry 740 can be configured to perform one or more of the functions described herein, such as activating and/or deactivating different back-off count procedures, allocating bandwidth, and/or the like.

In certain embodiments, one or more antennas may be coupled to or included in the PHY circuitry 720. The antenna(s) can transmit and receive wireless signals, including transmission of HEW packets. As described herein, the one or more antennas can include one or more directional or omnidirectional antennas, including dipole antennas, monopole antennas, patch antennas, loop antennas, microstrip antennas or other types of antennas suitable for transmission of RF signals. In scenarios in which MIMO communication is utilized, the antennas may be physically separated to leverage spatial diversity and the different channel characteristics that may result.

The memory 750 can retain or otherwise store information for configuring the other circuitry to perform operations for configuring and transmitting HEW packets and performing the various operations described herein including the allocation of and using of bandwidth (AP) and using the allocation of the bandwidth (STA).

The computing device 710 can be configured to communicate using OFDM communication signals over a multi-carrier communication channel. More specifically, in certain embodiments, the computing device 710 can be configured to communicate in accordance with one or more specific radio technology protocols, such as the IEEE family of standards including IEEE 802.11-2012, IEEE 802.11n-2009, IEEE 802.11ac-2013, IEEE 802.11ax, DensiFi, and/or proposed specifications for WLANs. In one of such embodiments, the computing device 710 can utilize or otherwise rely on symbols having a duration that is four times the symbol duration of IEEE 802.11n and/or IEEE 802.11ac. It should be appreciated that the disclosure is not limited in this respect and, in certain embodiments, the computing device 710 also can transmit and/or receive wireless communications in accordance with other protocols and/or standards.

The computing device 710 can be embodied in or can constitute a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as IEEE 802.11 or IEEE 802.16, or other types of communication device that may receive and/or transmit information wirelessly. Similarly to the computing device 610, the computing device 710 can include, for example, one or more of a keyboard, a display, a non-volatile memory port, multiple antennas, a graphics processor, an application processor, speakers, and other mobile device elements. The display may be an LCD screen including a touch screen.

It should be appreciated that while the computing device 710 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In certain embodiments, the functional elements may refer to one or more processes operating or otherwise executing on one or more processors.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "communication station," "station" (also referred to as STA), "handheld device," "mobile device," "wireless device," "user device," and/or "user equipment" (UE) as used herein refers to a wireless communication device such as a cellular telephone, smartphone, tablet, netbook, wireless terminal, laptop computer, a femtocell, High Data Rate (HDR) subscriber station, access point, access terminal, a printer, a scanner, a copier, a facsimile machine, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station or some other similar terminology known in the art. An access terminal may also be called a mobile station, user equipment (UE), a user device, a station (STA), a wireless communication device, and/or some other similar terminology known in the art. Embodiments disclosed herein generally pertain to wireless networks. Some embodiments can relate to wireless networks that operate in accordance with one of the IEEE 802.11 standards including those applicable to high efficiency wide-area networks (WLAN), such as the IEEE 802.11 ax amendment.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a user device, a station (STA), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Orthogonal Frequency-Division Multiple Access (OFDMA), Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Example Embodiments

In accordance with example embodiments of the disclosure, there may be one or more non-transitory computer readable media including instructions stored thereon, which when executed by one or more processor(s) of an access point, cause the device to perform operations including identifying a media access control (MAC) address of a wireless communication station received from the wireless communication station, assigning a prefix to the MAC address of the wireless communication station, identifying a frame received from the wireless communication station, wherein the frame comprises the prefix and a random MAC address, replacing, using the prefix, the random MAC address in the frame with the MAC address of the wireless communication station, thereby resulting in a processed frame, and causing to transmit the processed frame to a destination device. In further example embodiments, assigning the prefix to the MAC address of the wireless communication station, may further include causing to transmit to the wireless communication station a plurality of prefixes assigned to the MAC address of the wireless communication station, wherein the prefix is included in the plurality of prefixes. In example embodiments, assigning the prefix to the MAC address of the wireless communication station may still further include generating a mapping table in a database, storing the MAC address of the wireless communication station in the mapping table, and assigning a plurality of prefixes to the MAC address of the wireless communication station in the mapping table, wherein the plurality of prefixes comprises the prefix. In yet further example embodiments, replacing the random MAC address in the frame with the MAC address of the wireless communication station may include identifying the prefix in the frame, identifying the prefix in the mapping table based on comparing the prefix in the plurality of prefixes in the mapping table, and identifying the MAC address of the wireless communication station in the mapping table using the prefix in the mapping table. In yet further example embodiments, assigning the prefix to the MAC address of the wireless communication station may further include authenticating the wireless communication station using one or more Diffie-Hellman (DH) parameters of at least one of the access point or the wireless communication station. In yet further example embodiments, the frame may comprise a prefix portion and a random MAC address portion, wherein the prefix portion comprises the prefix, a locally administered bit that indicates whether the random MAC address portion of the frame includes a random MAC address, and a unicast/multicast bit that indicates whether the frame is destined to be transmitted outside of a network domain associated with the access point. In yet further example embodiments, identifying the frame may include receiving a first frame comprising the prefix and a first random MAC address, receiving a first frame comprising the prefix and a first random MAC address, and determining the first random MAC address and the second random MAC address were generated using the prefix.

In accordance with an example embodiments of the disclosure, there may be an access point, including one or more processors in communication with the transceiver, at least one memory that stores computer-executable instructions, at least one processor of the one or more processors configured to access the at least one memory, wherein the at least one processor of the one or more processors is configured to execute the computer-executable instructions for, receiving, from a wireless communication station, a media access control (MAC) address of the wireless communication station received, assigning, at the access point, a prefix to the MAC address of the wireless communication station, receiving, from the wireless communication station, a frame comprising the prefix and a random MAC address, replacing, using the prefix, the random MAC address in the frame with the MAC address of the wireless communication station, thereby resulting in a processed frame, and transmitting, at the access point and to a destination device, the processed frame. In yet further example embodiments, assigning the prefix to the MAC address of the wireless communication station further includes transmitting to the wireless communication station a plurality of prefixes assigned to the MAC address of the wireless communication station, wherein the prefix included in the plurality of prefixes. In yet further example embodiments, replacing the random MAC address in the frame with the MAC address of the wireless communication station may include identifying the prefix in the frame, identifying, the prefix in the mapping table based on comparing the prefix to the plurality of prefixes in the mapping table, and identifying the MAC address of the wireless communication station in the mapping table using the prefix in the mapping table. In yet further example embodiments, assigning the prefix to the MAC address of the wireless communication station may still further include authenticating the wireless communication station using one or more Diffie-Hellman (DH) parameters of at least one of the access point and the wireless communication station. In yet further example embodiments, the frame may include a prefix portion and a random MAC address portion, wherein the prefix portion comprises the prefix, a locally-administered bit that indicates whether the random MAC address portion of the frame includes a random MAC address, and a unicast/multicast bit that indicates whether the frame is destined to be transmitted outside of a network domain associated with the access point. In yet further example embodiments, receiving the frame may include receiving a first frame comprising the prefix and a first random MAC address, receiving a second frame comprising a second random MAC address different than the first random MAC address, and determining the first random MAC address and the second random MAC address were generated using the prefix.

In accordance with an example embodiment of the disclosure, there may be a non-transitory computer readable medium including instructions stored thereon, which when executed by one or more processor(s) of an access point, cause the device to perform operations including identifying a beacon from an access point, generating a response to the beacon that includes a media access control (MAC) address and an indication that access point-administered MAC address randomization is supported, identifying a prefix or ranges of prefixes that includes the prefix received from the access point, generating a frame using the prefix and a randomly generated MAC address, and causing to send the frame to the access point. In further example embodiments, the frame may comprise a prefix portion and a random MAC address portion, wherein the prefix portion comprises the prefix, a locally-administered bit that indicates whether the random MAC address portion of the frame includes the random MAC address, and a unicast/multicast bit that indicates whether the frame is destined to be transmitted outside of a network domain associated with the access point. In yet further example embodiments, the random MAC portion may include a random value of a predetermined length. In yet further example embodiments, the medium, still may further include instructions that when executed by one or more processor(s) cause the device to perform an operation of causing to send to the access point acknowledgement of receipt of the prefix or range of prefixes. In yet further example embodiments, the medium, still may further include instructions that when executed by one or more processor(s) cause the device to perform an operation of determining to generate a second randomly generated MAC address for use with a subsequent frame sent to the access point during a current session.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-transitory computer readable medium including instructions stored thereon, which when executed by one or more processor(s) of an access point, cause a device to perform operations of:
    identifying a media access control (MAC) address of a wireless communication station received from the wireless communication station;
    determining a first prefix to the MAC address of the wireless communication station based on the MAC address;
    determining a second prefix to the MAC address of the wireless communication station based on the first prefix;
    identifying a frame received from the wireless communication station, wherein the frame comprises the second prefix and a random MAC address;
    replacing, using the second prefix, the random MAC address in the frame with the MAC address of the wireless communication station to generate a processed frame; and
    causing to transmit the processed frame to a destination device.

2. The non-transitory computer readable medium of claim 1, wherein determining the first prefix to the MAC address of the wireless communication station comprises:
    causing to transmit to the wireless communication station a plurality of prefixes assigned to the MAC address of the wireless communication station, wherein the first prefix is included in the plurality of prefixes.

3. The non-transitory computer readable medium of claim 1, wherein determining the first prefix to the MAC address of the wireless communication station comprises:
    generating a mapping table in a database;
    storing the MAC address of the wireless communication station in the mapping table; and
    assigning a plurality of prefixes to the MAC address of the wireless communication station in the mapping table, wherein the plurality of prefixes comprises the second prefix.

4. The non-transitory computer readable medium of claim 3, wherein replacing the random MAC address in the frame with the MAC address of the wireless communication station comprises:
    identifying the second prefix in the frame;
    identifying the second prefix in the mapping table based on comparing the second prefix to the plurality of prefixes in the mapping table; and
    identifying the MAC address of the wireless communication station in the mapping table using the second prefix in the mapping table.

5. The non-transitory computer readable medium of claim 1, wherein determining the second prefix to the MAC address of the wireless communication station comprises:
    authenticating the wireless communication station using one or more Diffie-Hellman (DH) parameters of at least one of the access point or the wireless communication station.

6. The non-transitory computer readable medium of claim 1, wherein the frame comprises a prefix portion and a random MAC address portion, wherein the prefix portion comprises the second prefix, a locally-administered bit that indicates whether the random MAC address portion of the frame includes a random MAC address, and a unicast/multicast bit that indicates whether the frame is destined to be transmitted outside of a network domain associated with the access point.

7. The non-transitory computer readable medium of claim 1, wherein identifying the frame comprises:
    receiving a first frame comprising the second prefix and a first random MAC address;
    receiving a second frame comprising a second random MAC address different than the first random MAC address; and
    determining the first random MAC address and the second random MAC address were generated using the second prefix.

8. An access point, comprising:
    one or more processors in communication with a transceiver;
    at least one memory that stores computer-executable instructions; and
    at least one processor of the one or more processors configured to access the at least one memory, wherein the at least one processor of the one or more processors is configured to execute the computer-executable instructions for:
    receiving, from a wireless communication station, a media access control (MAC) address of the wireless communication station;
    determining, at the access point, a first prefix to the MAC address of the wireless communication station;
    determining a second prefix to the MAC address of the wireless communication station based on the first prefix;
    receiving, from the wireless communication station, a frame comprising the second prefix and a random MAC address;

replacing, using the second prefix, the random MAC address in the frame with the MAC address of the wireless communication station, thereby resulting in a processed frame; and transmitting, at the access point and to a destination device, the processed frame.

9. The access point of claim 8, wherein determining the second prefix to the MAC address of the wireless communication station comprises:

transmitting to the wireless communication station a plurality of prefixes assigned to the MAC address of the wireless communication station, wherein the second prefix is included in the plurality of prefixes.

10. The access point of claim 8, wherein determining the second prefix to the MAC address of the wireless communication station comprises:

generating a mapping table in a database;

storing the MAC address of the wireless communication station in the mapping table; and assigning a plurality of prefixes to the MAC address of the wireless communication station in the mapping table, wherein the plurality of prefixes comprises the second prefix.

11. The access point of claim 10, wherein replacing the random MAC address in the frame with the MAC address of the wireless communication station comprises:

identifying the second prefix in the frame;

identifying, the second prefix in the mapping table based on comparing the second prefix to the plurality of prefixes in the mapping table; and identifying the MAC address of the wireless communication station in the mapping table using the second prefix in the mapping table.

12. The access point of claim 8, wherein determining the second prefix to the MAC address of the wireless communication station comprises:

authenticating the wireless communication station using one or more Diffie-Hellman (DH) parameters of at least one of the access point and the wireless communication station.

13. The access point of claim 8, wherein the frame comprises a prefix portion and a random MAC address portion, wherein the prefix portion comprises the second prefix, a locally-administered bit that indicates whether the random MAC address portion of the frame includes a random MAC address, and a unicast/multicast bit that indicates whether the frame is destined to be transmitted outside of a network domain associated with the access point.

14. The access point of claim 8, wherein receiving the frame comprises:

receiving a first frame comprising the second prefix and a first random MAC address;

receiving a second frame comprising a second random MAC address different than the first random MAC address;

determining the first random MAC address and the second random MAC address were generated using the second prefix.

\* \* \* \* \*